United States Patent
Patrick et al.

[15] 3,706,974

[45] Dec. 19, 1972

[54] INTERFACE MULTIPLEXER

[72] Inventors: Robert L. Patrick; Patrick L. Rickard, both of Boca Raton, Fla.

[73] Assignee: International Business Machines Corporation, Armonk, N.Y.

[22] Filed: Oct. 27, 1971

[21] Appl. No.: 194,078

[52] U.S. Cl. ....................340/172.5

[51] Int. Cl. ....................G06f 9/18

[58] Field of Search ....................340/172.5; 235/157

[56] References Cited

UNITED STATES PATENTS

| | | | |
|---|---|---|---|
| 3,633,169 | 1/1972 | Bickford | 340/172.5 |
| 3,508,206 | 4/1970 | Norberg | 340/17.5 |
| 3,643,218 | 2/1972 | Cramwinckel | 340/172.5 |
| 3,447,135 | 5/1969 | Calta et al. | 340/172.5 |
| 3,408,632 | 10/1968 | Hauck | 340/172.5 |
| 3,473,155 | 10/1969 | Couleur et al. | 340/172.5 |
| 3,419,852 | 12/1968 | Marx et al. | 340/172.5 |
| 3,553,656 | 1/1971 | Bernhardt | 340/172.5 |
| 3,593,290 | 7/1971 | Kerr | 340/147 |

*Primary Examiner*—Gareth D. Shaw
*Assistant Examiner*—Mark Edward Nusbaum
*Attorney*—Earl C. Hancock et al.

[57] ABSTRACT

A plurality of devices any one of which can request service by a central controlling unit are interconnected in a loop arrangement by an enabling line. The controlling unit is effectively coupled in parallel to all the devices so that the presence of a service request by one of them will immediately initiate operations that will result in one of the devices being granted service. Each device includes logic circuitry to force it to actuate its leg of the enabling line loop if it was the device granted last service or if it does not have a service request present. The connection of the device to the controlling unit results only if it has a service request and receives an enabling line signal from the device preceding it on the loop. Means for bypassing device requests to read high priority requests can be included as can means to initiate data gating overlapping with the establishing of the servicing connection.

6 Claims, 4 Drawing Figures

INVENTORS
ROBERT L. PATRICK
PATRICK L. RICKARD

BY Carl C. Hensch
ATTORNEY

INTERFACE MULTIPLEXER

CROSS REFERENCE TO RELATED APPLICATION

Application Ser. No. 194,075 concurrently herewith entitled, "Data Acquisition and Control System," by M. I. Davis, J. M. Loffredo, P. L. Rickard and L. E. Wise and assigned to the same assignee as this application describes a system environment in which this invention is particularly well suited.

BACKGROUND OF THE INVENTION

1. Field of the Invention

This invention relates to circuits for establishing interconnections between a controlling unit and any one of a plurality of devices which can each contend for the attention of the controlling unit. More particularly, this invention is concerned with a system for coupling any one of a plurality of contending I/O devices to a common interface with a central processing unit. This invention is especially useful for providing high speed multiplexing of a multiplicity of I/O devices into a common connection with a central processing unit with the system being particularly well suited to the fast response demands associated with data acquisition and process control systems.

2. Description of the Prior Art

Fast polling schemes for multiplexing a large number of I/O devices into a common interface have used fixed polling lists of all the contending devices. This means that the list must be sequentially scanned each time a service request appears with an attendant delay in establishing the connection between an initiating device and the central processing unit, this delay being longer the further down the list that the requesting device resides. In many systems, this further means that a device located low in the polling list could be effectively blocked from communicating with the controlling unit since the polling list scan returns to the first device on the list after servicing a request. For many CPU to I/O data exchange operations, these delays are acceptable, but such delays are often intolerable in the data acquisition and process control environment.

One effort towards speeding the time of response while preventing one device from effectively blocking access from other devices is shown in U.S. Pat. No. 3,543,242, "Multiple Level Priority System," by Adams et al. and U.S. Pat. No. 3,543,246 entitled, "Priority Selector Signalling Device," by Adams, both of which issued on Nov. 24, 1970 and are assigned to the same assignee as this application. Both of these patents are concerned with an arrangement wherein all service requests occurring within a timeframe are honored before accepting further requests but even in those systems a fixed polling list was employed for scanning. However, they did contemplate an overriding interrupt to seize the interface whenever it appeared data would be lost otherwise. An open loop approach to servicing I/O devices has been used in the IBM System/360 Selector Channel operation wherein servicing is effectively passed from one device to another in sequence. However, even in that system there is no way to immediately attach a requesting device to the process interface.

SUMMARY OF THE INVENTION

This invention is concerned with circuitry for rapidly attaching any one of a plurality of potentially contending devices to a common interface connection. Each device can produce a signal indicating that it requests servicing and the control unit inspects these requests in parallel so as to immediately initiate the attachment procedure as soon as any request signal appears. The devices are coupled in an essentially closed loop arrangement by an enabling line with each device including logic circuitry for actuating this enabling line to the next device on the loop if the device was the last one to be serviced or if it does not have a pending request but has received an enabling line actuating signal from the preceding device on the loop. If the device has received an enabling signal from the preceding device in the loop and if it has a pending request, that device will be promptly coupled to the interface as soon as the control unit provides an indication that the interface is available. This avoids the time penalty associated with fixed polling list scanning and further ensures that no device on the loop can be effectively blocked from the interface by a device preceding it on the loop. Furthermore, the invention performs its multiplexing operations in such a manner that it is effectively invisible to both the processor and the devices. Still further, the lack of a fixed polling list makes it possible to switch positions of the devices in the loop or to add or delete devices in the loop with relative ease.

The invention is also readily adaptable for including a priority override so that all devices not granted this priority will be blocked from contending if any priority request is present. However, all devices that are assigned a priority will compete amongst themselves in the loop in the same manner as mentioned previously. Typically the devices not assigned priority might still be competing at the processor level on assigned priority of interrupt servicing in a manner similar to that described in the previously referenced and copending Davis et al. application. Under those circumstances, the priority level assigned in conjunction with this invention can be allocated to devices operating on a cycle steal basis.

The present invention makes it possible to realize an additional response time reduction by making it possible to permit the device which is going to be selected to commence gating its data onto the bus to the CPU even before the interface connection has been completed. This is possible because a device raising a service request and also receiving an enabling signal from the preceding device in the loop effectively knows it is going to be connected to the interface as soon as it is available.

Accordingly, an object of this invention is to provide an interface multiplexer between a plurality of devices and a common interface.

Another object of this invention is to provide multiplexing of a plurality of devices into a common interface in such a manner that the multiplexing operation is invisible to the data processing equipments coupled to that interface and all the devices.

Yet another object of this invention is to provide multiplexing of a plurality of devices to a common interface in a manner that requires minimal time between appearance of a service request and actual effecting of the device/interface interconnection.

Still another object of this invention is to permit multiplexing of many devices into an interface without a rigid polling list so that devices can be readily added or deleted.

A further object is to provide multiple device to interface multiplexing so that no one device can monopolize the interface connections.

The foregoing and other objects, features and advantages of the present invention will be apparent from the following more particular description of the preferred embodiment of the invention as is illustrated in the accompanying drawings.

DESCRIPTION OF THE PREFERRED EMBODIMENT

Figure 1:
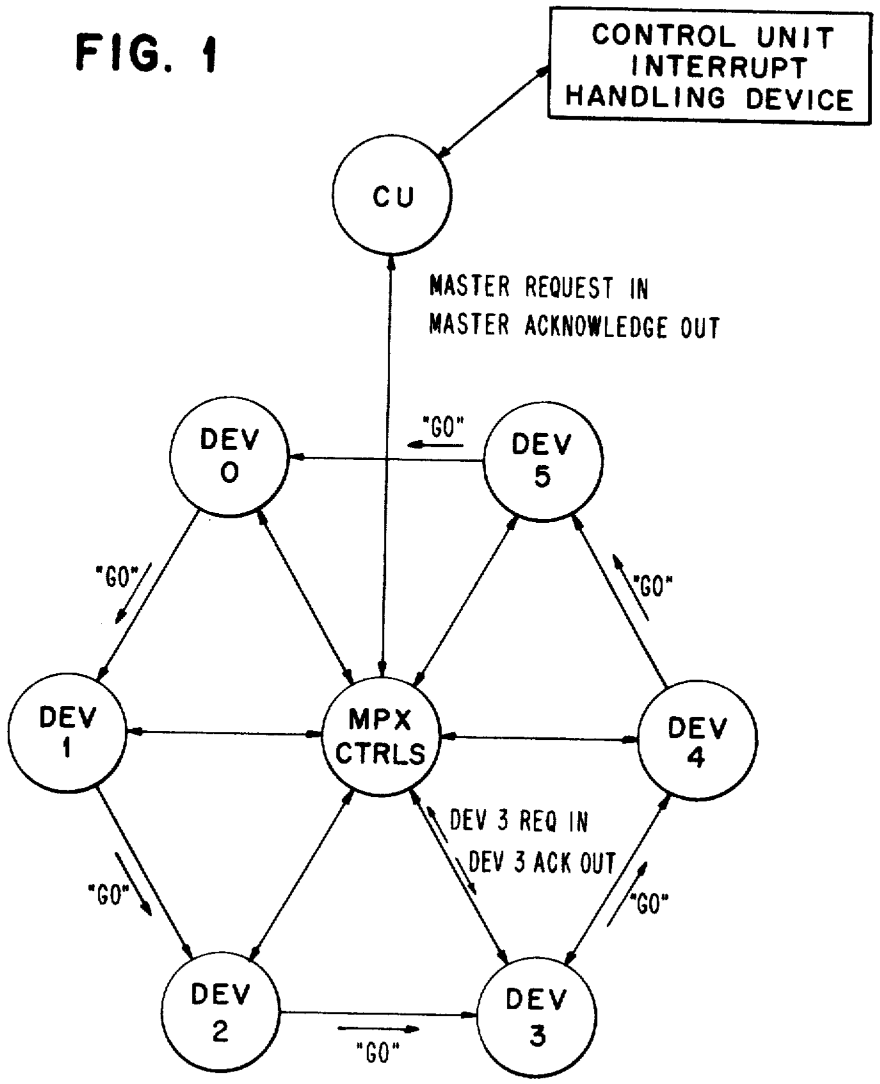
FIG. 1 shows an overall arrangement of the general blocks involved in a multiplexer in accordance with the present invention.

The multiplexing configuration in accordance with the present invention is shown in its overall operating relation in FIG. 1. To facilitate the explanation, the invention will be described assuming that the multiplexer is to provide interfacing between a control unit and any one of six devices, each of which is capable of requesting service. These devices are indicated as DEV 0, DEV 1, etc. through DEV 5. By use of the multiplexer of this invention, immediate attachment of one of these interrupt sources to the interrupt handling unit is allowed without the need for recourse to time-consuming polling of those interrupt sources.

The basic logic required for this invention involves three latches (device request, device acknowledge and last service) for each source requiring service DEV 0 through DEV 5 and one master request latch contained within the multiplexer controls MPX CTRLS. The operation centers around a loop-type line in the device logic which is indicated as the GO line. This GO line is forced active by the last source which was serviced by the multiplexer. It passes through the multiplexer control logic of each interrupt source DEV 0 – DEV 5 and, if none require service, becomes active to all sources.

Conversely, if a source requires service and the master request latch is not set within the multiplexer controls, the source sets its request latch which, with the fact that this source has an active "GO," will set the master request latch to the interrupt handling device or control unit (CU). If a source sets its request latch, it degates the propagation of the GO line to the subsequent devices in the loop. The settling of the master request latch degates other sources from setting their request latches. If more than one device requires service at the same instant, they both are permitted to set their respective request latches. When the interrupt handling unit responds with an acknowledge signal such as DEV 3 ACK OUT indicated in FIG. 1, only the source with its request on and still being forced GO can set its acknowledge latch. At the end of the sequence, all of the last service latches are reset and the device which has just received service has its last service latch set thereby forcing the GO signal to the subsequently connected sources. The fact that GO is active to all sources at the same time means that any source can be connected to the handling unit instantly.

The multiplexer also has the capability of allowing for priority requests. If a source with its priority bit set requires service, the multiplexer promotes the priority of its request to the exclusion of all non-priority service requests. The priority bit can be program set and thus can be dynamically manipulated to rearrange the sequence of servicing. Whenever the multiplexer controls are able to accept a service request and assuming the presence of a priority request, all other requesting sources are bypassed and the first device in the loop with its priority bit set is serviced. If more than one source has its priority bit on, the servicing of these priority requests is cyclic following the GO line.

The present invention allows the first address transfer to be presented to the handling unit along with the request for service thereby increasing the speed with which the central processing unit can respond to service requests. This is accomplished by allowing the multiplexer control logic to gate the address bus for the device requiring service. The device is not aware that it will be provided with service until it has received Acknowledge Out from the multiplexer controls although the multiplexer control logic would already be aware of which device will be acknowledged when it raises its master request. This saves valuable time in a sequence since the presentation of the first address transfer is effectively overlapped with the time taken to cause a master acknowledge signal.

In a typical system configuration, the interrupt handling device or control unit CU would provide inputs for a central processing unit which would control the exchange of commands and data with a multiplicity of input/output devices. Such data interchanges could be as are generally well known in the art or could follow arrangements such as are shown in the concurrently filed application entitled, "Data Acquisition and Control System," by Davis, Loffredo, Rickard and Wise, which is assigned to the same assignee as this application. The present invention is particularly useful in an environment such as the Davis et al. system since it materially increases the speed of response between devices requiring service and the central processing unit CPU.

All data passed to the control unit from the interrupting devices goes via a common bus called DATA BUS IN. Devices only gate their data onto this bus after receiving an ACK OUT signal. The multiplexer control logic selectively gates this signal to the one device being serviced. The interrelationship of the various components in this multiplexer control logic will be better understood from the specific description of the operation with one device.

It will be assumed as initial conditions that after power is applied to the logic a system reset or "+ RST CTRLS" signal is generated by the CU logic. This resets the master request latch 10 in FIG. 2 and resets all of the device last service latches, except last service 0, through OR gate 29 in FIG. 2. The OR gates 28 of FIG. 2 and 50 of FIG. 4 allow a reset, set sequence of the last service 0 latch. The last service 0 latch being set forces the GO signal to start propagating around the loop (FIG. 1) through the OR gate 51 in FIG. 4. The GO line will propagate through identical logic as in FIG. 4 and become an active level to every device.

Figure 2:
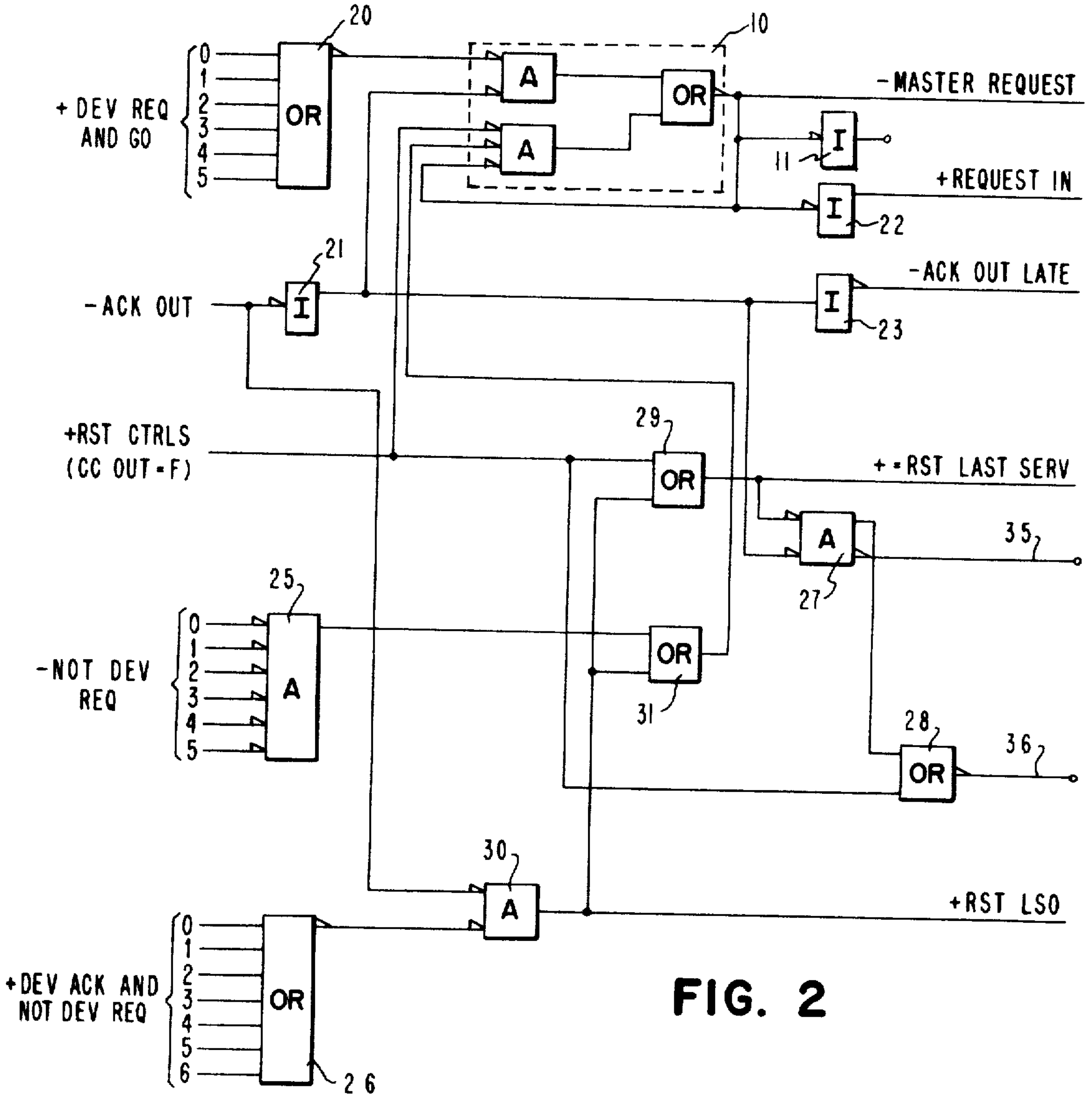
FIG. 2 is the logic circuitry associated with the multiplexer controls shown in FIG. 1.
Figure 4:
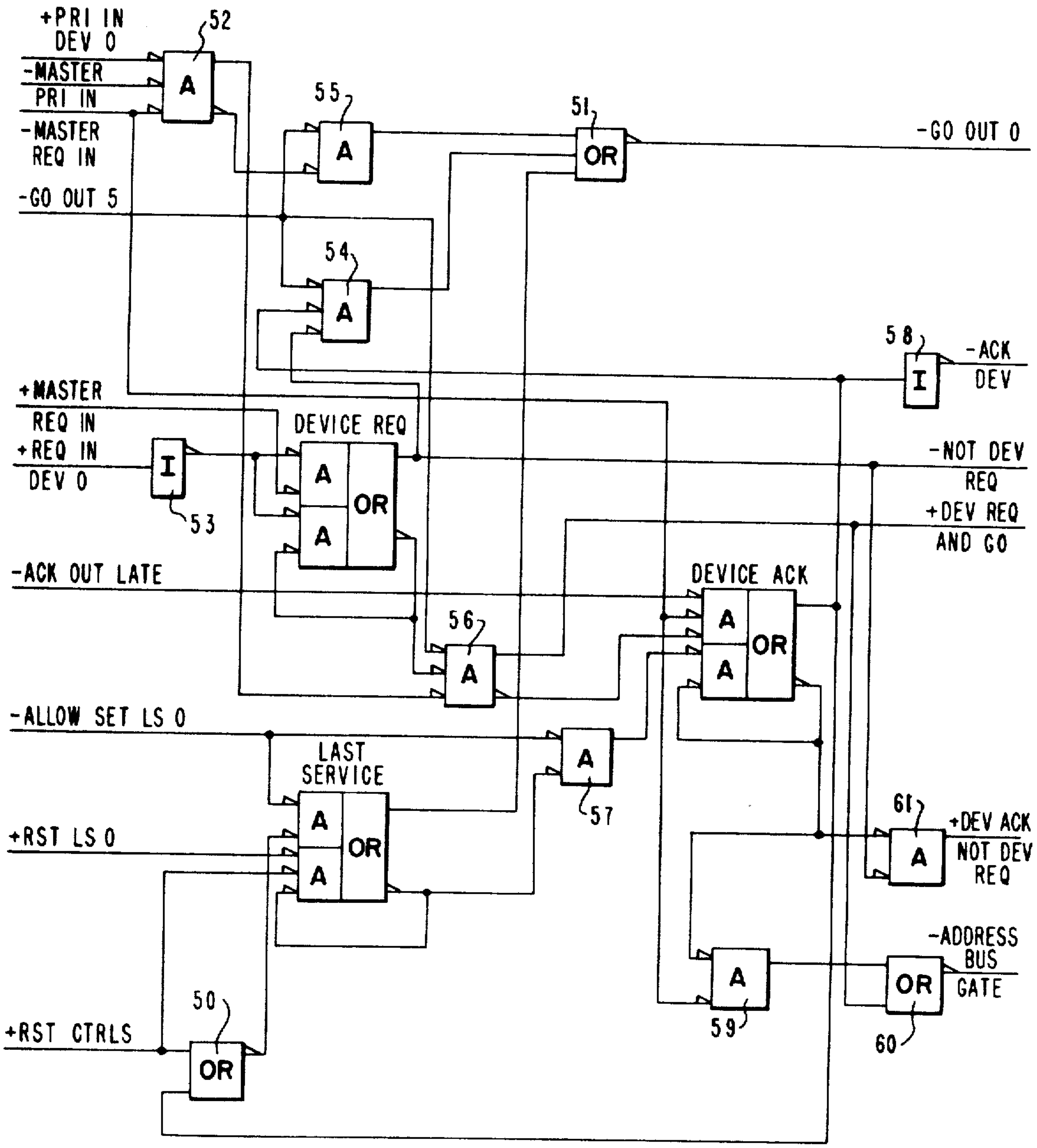
FIG. 4 illustrates the logic circuitry which would be generally employed for the devices shown in FIG. 1 but particularly modified to operate as the device 0 control logic.

When the source of an interrupt request indicates that it requires servicing, a signal + REQ IN DEV 0 will be generated as a device originated input to the FIG. 4 circuit which, through invert circuit 53, will actuate the device request latch such that AND 54 will not be conditioned to propagate the GO signal to the next device. Note that, if the device is not to be granted a priority interrupt, AND 52 would be conditioned such that AND 55 would propagate the GO signal if there was a priority interrupt present from another device. Assuming that no priority interrupt is present or the device is capable of competing as a priority interrupt, the receipt of the GO signal from the preceding device would complete the conditioning of AND 56 so that a + DEV REQ AND GO output would be provided to the logic circuitry of FIG. 2. This signal in FIG. 2 provides one of the inputs for OR 20 to set the Master Request latch 10. Note that there must be an absence of an Acknowledge Out signal − ACK OUT through invert 21 in order to permit the Master Request latch to be set. This is to prevent a device service request from interrupting a prior servicing which is in process.

The setting of the Master Request latch 10 provides an input through invert circuit 22 to the control unit to indicate that a service request is present and also propagates the + Master Request line via inverter 11 to all devices to degate any other device request latches from setting.

The control unit responds to the request for service by raising its − ACK OUT line to invert 21. This signal is passed through invert circuits 21 and 23 to produce the − ACK OUT LATE signal which is in turn relayed to the control circuitry of FIG. 4.

The presence of the Acknowledge Out Late signal will effect the setting of the device acknowledgment latch DEVICE ACK. This will cause a signal through invert 58 to produce the − ACK DEV signal to the feature module. That is, the device which is being controlled by DEV 0 can then respond to − ACK DEV by gating signals to the control unit for interrupt handling since the Acknowledge Out signal indicates that the interrupt request is going to be at least initially reviewed. The attachment of an interrupting source to the interrupt handler is now complete.

The attachment of the source to the handler is maintained until the source decides it has finished and drops its Request Line. The "not" Request Line propagates through inverter 53 of FIG. 4 and resets the Device Request latch. Since the Device Ack latch is still set and the Device Req latch is reset AND gate 61 is conditioned generating the signal + DEV ACK NOT DEV REQ. This goes through Or gate 26 of FIG. 2 and AND gate 30, since − ACK OUT is still active. This signal now resets the last service latch of device 0 and propagates through OR gate 29 resetting all the other last service latches. It also goes through OR gate 31 and resets the master request latch 10.

Dropping of the master request line to the control unit causes it in turn to drop the master ACK OUT signal. The ACK OUT signal dropping at inverter 21 in FIG. 2 causes AND gate 30 to be deconditioned. The output of AND gate 30 and OR gates 29 and 31 become inactive. The ACK OUT signal dropping through inverter 21 allows AND gate 27 to be conditioned since OR gate 29 is no longer active. AND gate 27 being active generates the signal minus allow set last service on line 35. AND gate 27 being active also allows OR gate 28 to become active generating minus allow set last service 0 on line 36.

Since the Device Ack latch of FIG. 4 is still set, the last service latch is now conditioned to be set since minus allow set last service is active (indicated as − ALLOW SET LS 0 for Device 0 in FIG. 4) and Device Ack is active through OR gate 50 FIG. 4. The setting of the last service latch allows AND gate 57 to be conditioned This AND gate making resets the Device Acknowledge latch. The last service latch being on starts the propagation of the GO signal through OR gate 51. One interrupt sequence is now complete.

The AND gate 25 of FIG. 2 is only used to insure that the master request latch gets reset in the event an interrupting source drops its request before the CU can answer with an ACK OUT and there are no other sources requesting.

Figure 3:
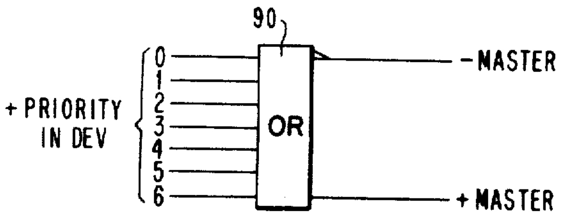
FIG. 3 contains the logic for generating the specific priority related interrupt requests.

FIG. 3 generally illustrates the manner of generating the master priority signals MASTER PRI. The + PRIORITY IN DEV signals are produced by whichever device has been permitted to compete on a priority level as compared to the other devices. Any of the attached devices which has been granted the ability to generate a priority input signal would produce an input to the OR circuit 90 so that the appropriate + and − Master Priority Input signals will be propagated back to the devices as shown in FIG. 4.

Reviewing the operation of the present invention, the system is initialized by setting the Last Service Latch of Device DEV 0. This results in the GO line from DEV 0 to DEV 1 being raised. If there is no Service Request present in DEV 1, it will likewise raise its GO line to DEV 2. This will continue around the loop until such time as the GO line from DEV 5 to DEV 0 is raised, assuming that no Service Requests are present. By this conditioning arrangement, the appearance of any Service Request at any device DEV 0 through DEV 5 will cause an immediate response by the multiplexer controls to raise an Interrupt Request to the interrupt handling device. The device originating the Interrupt Request would then degate the GO line to other devices so that it would immediately receive servicing as soon as the interrupt handling control unit presented a Master Acknowledge Out signal to the multiplex controls. Because of the arrangement for permitting Priority Interrupts, the device which might have initiated a Service Request can be bypassed and the service Request actually granted to a subsequent device in the loop if the Priority Request occurs before service is granted to the originating device. By use of the Last Service latch, no one device can monopolize the multiplexer controls and must cyclically wait its turn if there are other requests which are pending after its request has been raised. The central processing unit can force the stacking of service for interrupt requests by returning a command to the device that drops its service request or REQ IN DEV as shown in FIG. 4.

This will permit the multiplexer to continue recognizing other service requests to either permit them to establish an interrupt over previous interrupts or to stack the interrupts until the processor can accept them.

Although the invention has been particularly described and shown relative to the foregoing embodiment, it will be understood by those having normal skill in the art that various other changes, additions and embodiments may be made without departing from the spirit of this invention.

What is claimed is:

1. A device control circuit for use with one of a plurality of devices which contend for connection to an interface comprising means for receiving a service request signal from the associated said device, means for receiving an acknowledgement signal whenever said interface is available, means responsive to a sequence of receipt of a said acknowledgement signal followed by a signal indicative that said service request is no longer present for storing an indication that said device was granted the last servicing with said interface means for receiving an enabling signal input from the device control circuit associated with another of said devices, means for generating an enabling output signal for coupling to the device control circuit associated with another of said devices if (a) either said last servicing indication is present, or (b) said enabling signal input is received in the absence of a said associated device service request signal, and means responsive to receipt of a said enabling signal input, a said associated device service request signal and a said acknowledgment signal for controlling data communications by the associated said device with said interface.

2. The device control circuit in accordance with claim 1 which further includes means responsive to a signal designating that a last servicing indication has been stored in the device control circuit associated with another said device for removing said last servicing indication from said storing means.

3. Apparatus in accordance with claim 1 wherein at least one of said device control circuits further includes means responsive to an initializing signal associated with said interface communications for forcing the storing of a said last servicing indication, the others of said device control circuits responding to said initializing signal by clearing the said last servicing indication thereof.

4. Apparatus in accordance with claim 1 wherein each said device control circuits further includes means for receiving a signal indicative that the associated said device is allocated priority servicing, said enabling output signal generation means further includes means for forcing said enabling output signal if (a) said associated device priority signal is absent, (b) an enabling signal from another device control circuit is received, and (c) a signal is received indicating that at least one other device control circuit which has been allocated priority servicing has a service request signal.

5. Apparatus in accordance with claim 4 wherein each said device control circuit further includes priority condition indicating means responsive to a said priority servicing allocation signal and a said service request from the said associated device for providing an input to the said enabling output signal generating means of the other said device control circuits.

6. Apparatus in accordance with claim 5 wherein said interface communication establishing means of each said device control circuit is further responsive to said priority condition indicating means of the associated device and receipt of an enabling signal from said device control circuit associated with another said device for establishing said device/interface communications.

* * * * *